(12) United States Patent
Qi et al.

(10) Patent No.: US 11,423,165 B2
(45) Date of Patent: Aug. 23, 2022

(54) COMPUTER-IMPLEMENTED METHODS AND SYSTEM FOR PREVENTING UNAUTHORIZED FILE MODIFICATION BY MALICIOUS SOFTWARE AND THE LIKE

(71) Applicant: NeuShield, Inc., Fremont, CA (US)

(72) Inventors: Fei Qi, Dublin, CA (US); Yuen Pin Yeap, Saratoga, CA (US)

(73) Assignee: NeuShield, Inc., Fremont, CA (US)

( * ) Notice: Subject to any disclaimer, the term of this patent is extended or adjusted under 35 U.S.C. 154(b) by 217 days.

(21) Appl. No.: 16/935,782

(22) Filed: Jul. 22, 2020

(65) Prior Publication Data

US 2020/0349269 A1 Nov. 5, 2020

Related U.S. Application Data

(63) Continuation-in-part of application No. 15/981,010, filed on May 16, 2018, now abandoned.

(60) Provisional application No. 62/508,275, filed on May 18, 2017.

(51) Int. Cl.
| | | |
|---|---|---|
| *G06F 21/62* | (2013.01) | |
| *G06F 13/10* | (2006.01) | |
| *G06F 21/44* | (2013.01) | |

(52) U.S. Cl.
CPC ........ *G06F 21/6209* (2013.01); *G06F 13/102* (2013.01); *G06F 21/44* (2013.01)

(58) Field of Classification Search
CPC ..... G06F 21/6209; G06F 21/44; G06F 13/102
See application file for complete search history.

(56) References Cited

U.S. PATENT DOCUMENTS

| | | | | |
|---|---|---|---|---|
| 7,380,140 | B1* | 5/2008 | Weissman | G06F 21/575 |
| | | | | 709/213 |
| 2004/0107357 | A1* | 6/2004 | Jeon | G06F 21/568 |
| | | | | 713/193 |
| 2004/0148478 | A1* | 7/2004 | Leung | G06F 3/0623 |
| | | | | 711/163 |
| 2007/0162510 | A1* | 7/2007 | Lenzmeier | G06F 16/2365 |
| 2008/0120727 | A1* | 5/2008 | Lee | G06F 21/6218 |
| | | | | 726/30 |
| 2009/0019226 | A1* | 1/2009 | Edwards | G06F 9/4418 |
| | | | | 711/E12.029 |

(Continued)

*Primary Examiner* — Vance M Little
(74) *Attorney, Agent, or Firm* — PatentFile, LLC; Bradley C. Fach; Steven R. Kick

(57) ABSTRACT

In some embodiments, a cyber security method for preventing unauthorized file modification by malicious software and the like, the file accessible to an authorized handler may include: receiving a first access request from a program, the first access request having a first instruction set for modifying data of the file; determining if the file is associated with the authorized handler; processing the first instruction set to produce first modification data; and generating an initial virtual file object comprising the first modification data. In further embodiments, a cyber security method for preventing unauthorized file modification by malicious software and the like, the file accessible to an authorized handler may include: processing an instruction set for modifying a file to produce modification data; generating a virtual file object comprising the modification data; and associating the virtual file object with the file by identifying the file as a sparse file.

20 Claims, 11 Drawing Sheets

(56) References Cited

U.S. PATENT DOCUMENTS

| | | | |
|---|---|---|---|
| 2013/0080773 A1* | 3/2013 | Lu | G06F 21/602 |
| | | | 713/165 |
| 2015/0127614 A1* | 5/2015 | Williams | G06F 3/065 |
| | | | 707/649 |
| 2017/0048656 A1* | 2/2017 | Kwon | H04W 4/80 |
| 2018/0020013 A1* | 1/2018 | Yoshikawa | H04L 63/1416 |
| 2018/0211038 A1* | 7/2018 | Breiman | H04L 63/145 |

* cited by examiner

COMPUTER-IMPLEMENTED METHODS AND SYSTEM FOR PREVENTING UNAUTHORIZED FILE MODIFICATION BY MALICIOUS SOFTWARE AND THE LIKE

CROSS REFERENCE TO RELATED APPLICATIONS

This application is a continuation-in-part of U.S. Non-Provisional application Ser. No. 15/981,010, filed on May 16, 2018, entitled "COMPUTER-IMPLEMENTED METHODS AND SYSTEM FOR PREVENTING UNAUTHORIZED FILE MODIFICATION BY MALICIOUS SOFTWARE AND THE LIKE", which claims the benefit of U.S. Provisional Patent Application No. 62/508,275, filed on May 18, 2017, entitled "A method to prevent malicious software from corrupting data", the entire disclosures of which are incorporated by reference herein.

FIELD OF THE INVENTION

This patent specification relates to the field of cyber security. More specifically, this patent specification relates to a system and method for preventing unauthorized file modification to one or more files of a software data store.

BACKGROUND

Preventing unauthorized file modification is a problem constantly faced by users of client devices, such as computers, and by data storage professionals. Unauthorized file modification can take many forms. For example, a user of a client device may accidentally erase a file or unintentionally modify a file. In order to restore the file, the user or a data storage professional may have to locate another copy or backup of the file and then restore the file from the copy or backup. If a copy or backup was not made or able to be located, the data of the file may be lost.

As another example, many malicious software programs exist which are commonly known as ransomware and which will attempt to modify files on a client device so that they are un-accessible or unusable until a ransom is paid. Many products attempt to protect against ransomware through detection. Some use signatures while others use machine learning, heuristics, or other means. Detecting and blocking is the typical way that antivirus software works and is effective for known ransomware. However undetected ransomware cannot be blocked with these solutions. To make matters worse, ransomware authors will routinely check their ransomware against services like VirusTotal to ensure that their ransomware cannot be detected. Relying on detection alone is not an adequate way to protect your device from ransomware.

Some anti-ransomware solutions will create a backup of the files to another location on the disk before they are modified. This way once ransomware is detected they can revert these files back to a pre-encrypted state. Backing up files works pretty good for typical ransomware, however there are several problems with this approach. First, backing up files doubles the disk activity (I/O) because each file that is modified needs to be backed up one-by-one, meaning it causes a significant performance hit. Secondly, many ransomware programs will start out by attempting to delete all backups before encrypting the original file. In this case there is no way to recover since the backup has been destroyed. Finally, there are ransomware programs, such as NotPetya and Shamoon, that will do full disk encryption or simply wipe the disk of all data. For these cases backing up the files won't help since the disk itself is overwritten.

Another approach that ransomware solutions take is to block write access to unknown programs and only allow access to approved applications. This way ransomware is blocked from encrypting files in protected folders. At first glance this sounds like a good approach. However, enabling a feature like this can be problematic since it is difficult for users to figure out which applications need to be approved. For managed environments this can cause continuous complaints from users with different third-party applications don't work. Also, a potentially worse problem is that allowing an application opens a backdoor to allow ransomware in. Ransomware can use these approved applications to encrypt data. For example, there are ransomware programs that use Microsoft Word macros to encrypt files. In addition, this does not help against ransomware that encrypts or wipes the full disk of all data. Controlling access to folders does not fully protect you from ransomware.

Therefore, a need exists for novel computer-implemented systems and methods for preventing unauthorized file modification. A further need exists for novel computer-implemented systems and methods for preventing unauthorized file modification that are configured to prevent malicious software from accessing files. Finally, there is a need for novel computer-implemented systems and methods for preventing unauthorized file modification that do not increase disk usage and cause a significant performance overhead.

BRIEF SUMMARY OF THE INVENTION

A system and method for preventing unauthorized file modification by malicious software and the like are provided which may be used to prevent unauthorized file modification to one or more files in a data store of electronic devices, such as client devices and servers. Unauthorized file modification may describe any change to a file that may ultimately be undesirable to a user, such as having the file encrypted, deleted, or otherwise changed, immediately after the change or at some later point in time after the change.

According to one embodiment consistent with the principles of the invention, a computer implemented cyber security method for preventing unauthorized file modification to a file, the file accessible to an authorized handler, is provided. In some embodiments, the method may include the steps of: receiving a first access request from a program, the first access request having a first instruction set for modifying data of the file; determining if the file is associated with the authorized handler; processing the first instruction set to produce first modification data; and generating an initial virtual file object comprising the first modification data.

In further embodiments, the method may include the step of deleting the initial virtual file object if processing of the first instruction set produces unauthorized modification data.

In still further embodiments, the method may include the step of receiving a read request for the file, and the step of returning first merged data, the first merged data describing the first modification data incorporated with the data of the file.

In yet further embodiments, the method may include the step of receiving a write request for the file, the write request having a second instruction set for modifying data of the file, the step of processing the second instruction set with the first modification data to produce second modification data, and the step of generating a subsequent virtual file object comprising the second modification data.

In even further embodiments, the method may include the step of receiving a read request for the file, and the step of returning second merged data, via the authorized handler, the second merged data describing the second modification data of the subsequent virtual file object incorporated with the data of the file.

According to another embodiment consistent with the principles of the invention, a computer implemented cyber security method for generating a virtual file object is provided. In some embodiments, the method may include the steps of: processing an instruction set for modifying a file to produce modification data; generating a virtual file object comprising the modification data; and associating the virtual file object with the file by identifying the file as a sparse file.

In even further embodiments, the method may include the step of deleting the virtual file object if processing of the first instruction set produces unauthorized modification data.

In even further embodiments, the method may include the step of receiving a read request for the file, and the step of returning first merged data, the first merged data describing the first modification data incorporated with the data of the file.

According to another embodiment consistent with the principles of the invention, a computer implemented cyber security method for preventing unauthorized modification to a file using an authorized handler may include the following steps: modifying a file attribute of the file to create a protected file, the file attribute configured to instruct a computer processor to permit write access of the protected file only by the authorized handler and to deny write access of the protected file by other programs; receiving a first write request, the first write request having an instruction set to be written to the protected file, the first write request unable to be written to the protected file and is instead transferred to the authorized handler which modifies an initial virtual file object to include the instruction set from the first write request, the initial virtual file object comprising merged data where the merged data comprises source data from the protected file and modification data from the instruction set of the write request; receiving a read request of the protected file; determining if there is an initial virtual file object associated with the protected file; determining if the initial virtual file object comprises merged data; and based on the determination of the initial virtual file object comprising merged data, returning only one of either (i) the merged data of the initial virtual file object and (ii) the source data of the protected file.

In further embodiments, the method may include the following steps performed by the authorized handler in the following sequential order: generating a copy of the source data of protected file; and modifying the protected file with one of (i) the merged data and (ii) the initial virtual file object.

In further embodiments, the authorized handler may generate a supplemental virtual file object comprising supplemental merged data after receiving a second write request.

In further embodiments, the protected file may be unassociated from the initial virtual file object and the protected file is associated with the supplemental virtual file object so that the supplemental merged data is returned in responses to a subsequent read request of the protected file.

In further embodiments, the method may include the step of automatically removing the initial virtual file object after a period of time.

In further embodiments, the method may include the step of removing at least one of the initial virtual file object and the supplemental virtual file object after an unauthorized write request was made of the protected file.

In further embodiments, the method may include the step of removing the supplemental virtual file object upon receiving an unauthorized write request of the protected file and re-associating the protected file with the initial virtual file object.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
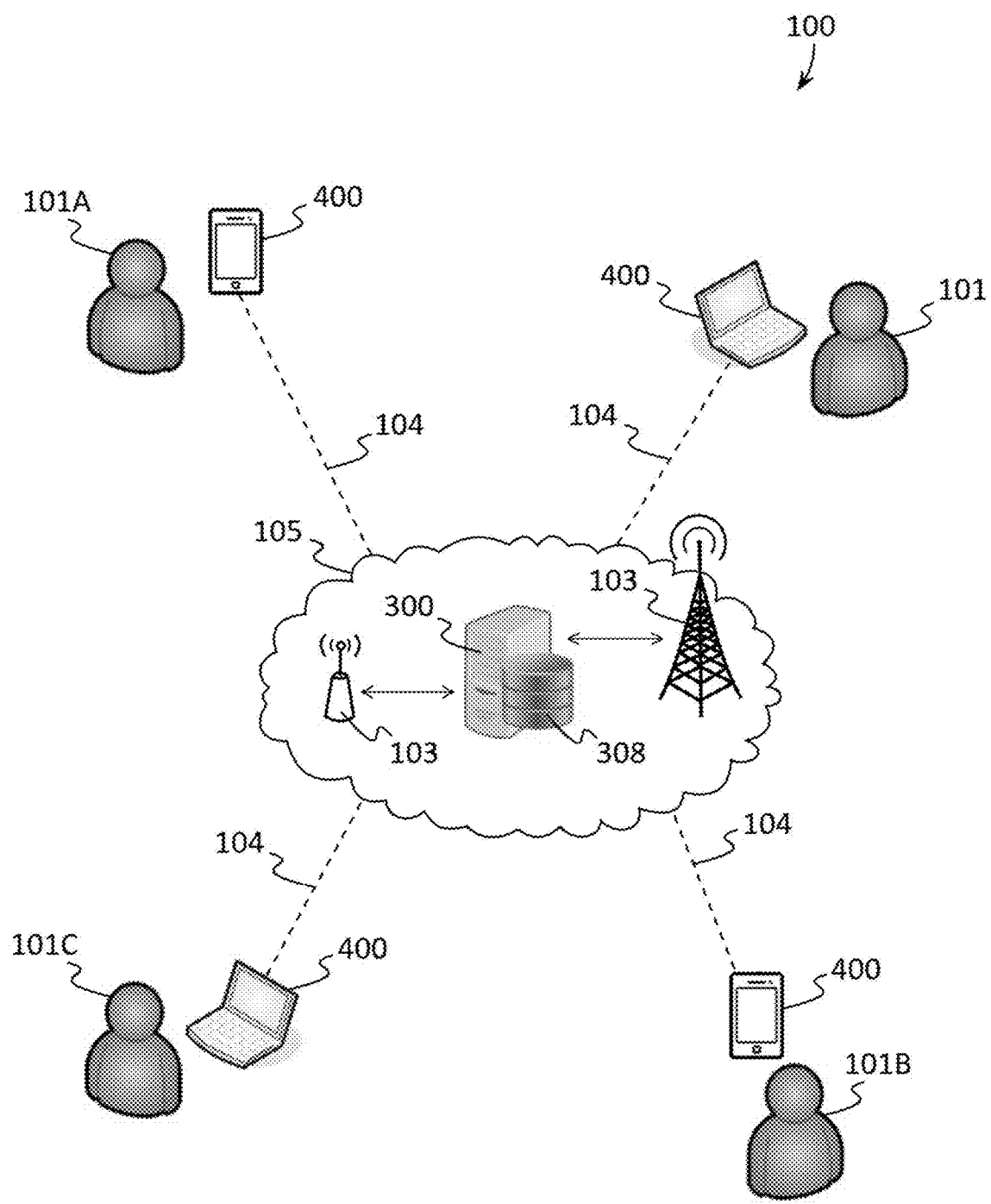
FIG. 1—FIG. 1 depicts an illustrative example of some of the components and computer implemented methods which may be found in system for preventing unauthorized file modification by malicious software and the like according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of client devices include: personal computers (PCs), workstations, laptops, tablet PCs including the iPad, cell phones including iOS phones made by Apple Inc., Android OS phones, Microsoft OS phones, Blackberry phones, Apple iPads, Anota digital pens, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, tablets, digital pens, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wi-Fi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigby network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for preventing unauthorized file modification are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a system for preventing unauthorized file modification by malicious software and the like ("the system") 100 according to some embodiments is presented. The system 100 is configured to facilitate the transfer of data and information optionally between one or more access points 103, client devices 400, and servers 300 over a data network 105. Each client device 400 may send data to and receive data from the data network 105 through a network connection 104 with an access point 103. A data store 308 accessible by the server 300 may contain one or more databases. The data may comprise any information one or more users 101 may input into the system 100, files and software utilized by a client device 400, files and software utilized by a server 300, or any other type of data or information which may be stored electronically.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

In some embodiments, the system 100 may be configured to prevent unauthorized file modification to one or more protected files 111 (FIG. 4) in a data store 308 (FIG. 2), 408 (FIG. 3), of electronic devices, such as client devices 400 and servers 300. Unauthorized file modification may describe any change to a protected file 111 that may ultimately be undesirable to a user 101, such as encryption of the file 111, deletion of the file 111, moving the file 111, or other modification of the file 111, immediately after the change or at some later point in time after the change. In preferred embodiments, the system 100 and methods disclosed herein provide a completely different approach than currently available cyber security programs to protecting files from unauthorized modification or changes by creating a protective shield between the protected files 111 and applications or programs 320 (FIG. 2), 420 (FIG. 3) of electronic devices, such as client devices 400 and servers 300 by storing changes to a protected file 111 as one or more virtual file objects 121, 122. When an accessing program 112 (FIG. 4), such as ransomware or any other application, tries to make changes to a protected file 111, the system 100 enables the original files to stay intact allowing users 101 to revert any unwanted change that has been made. While other cyber security programs will create backup copies of the protected files 111 which can dramatically increase disk usage and cause a significant performance overhead, the system 100 and methods disclosed herein preserve the original protected file 111 without requiring a backup of the files 111 which allows protection of protected files 111 with virtually no additional disk activity (I/O).

Figure 2:
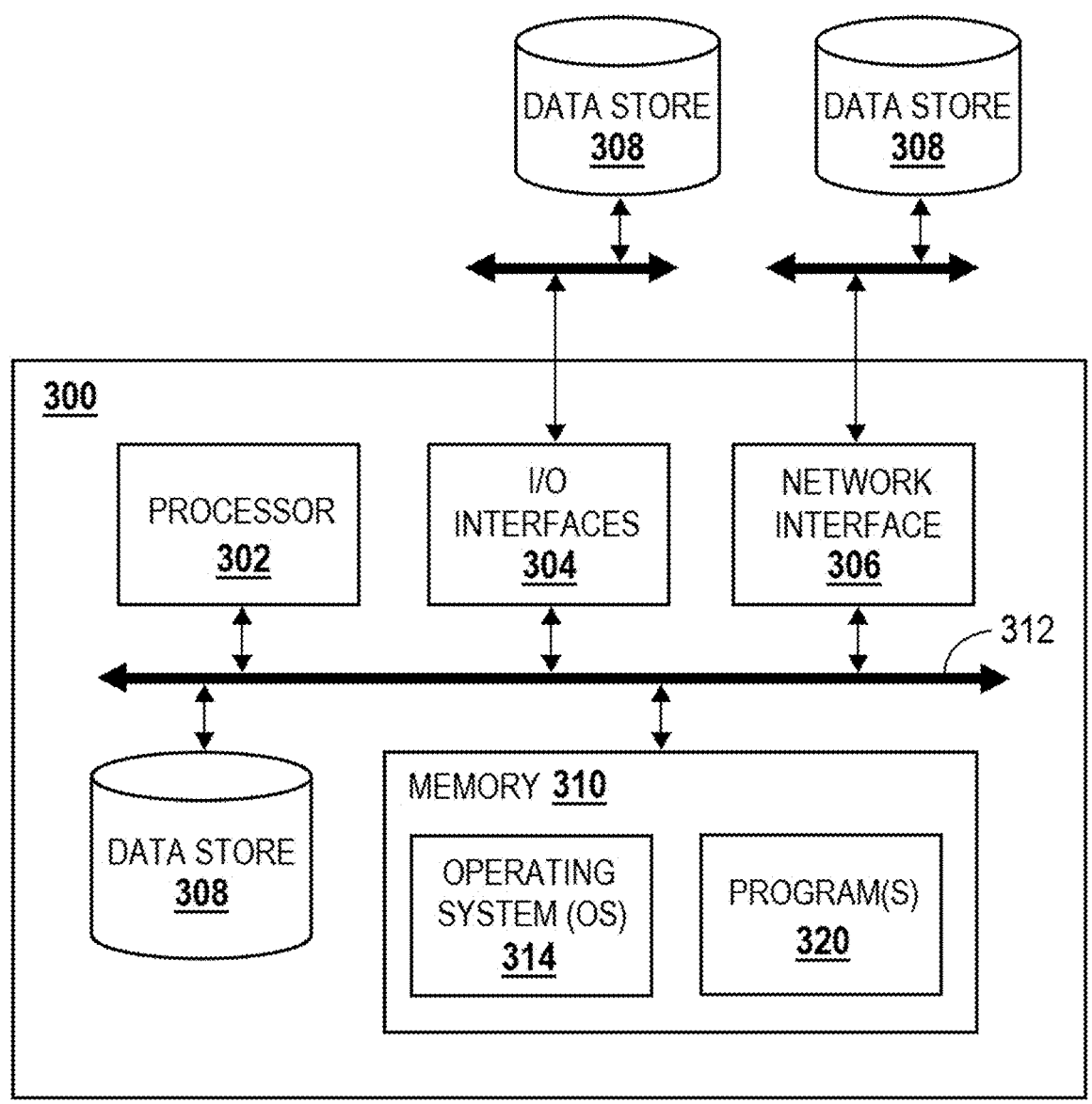
FIG. 2—FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof which may store one or more files 110, 111. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8.1, Windows 10, Windows Server 2003/2008/2012/2016 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like.

The server 300 may operate one or more programs 320, such as an accessing program 112 and an authorized handler 113, which may be configured to implement the various processes, algorithms, methods, techniques, etc. described herein.

Figure 3:
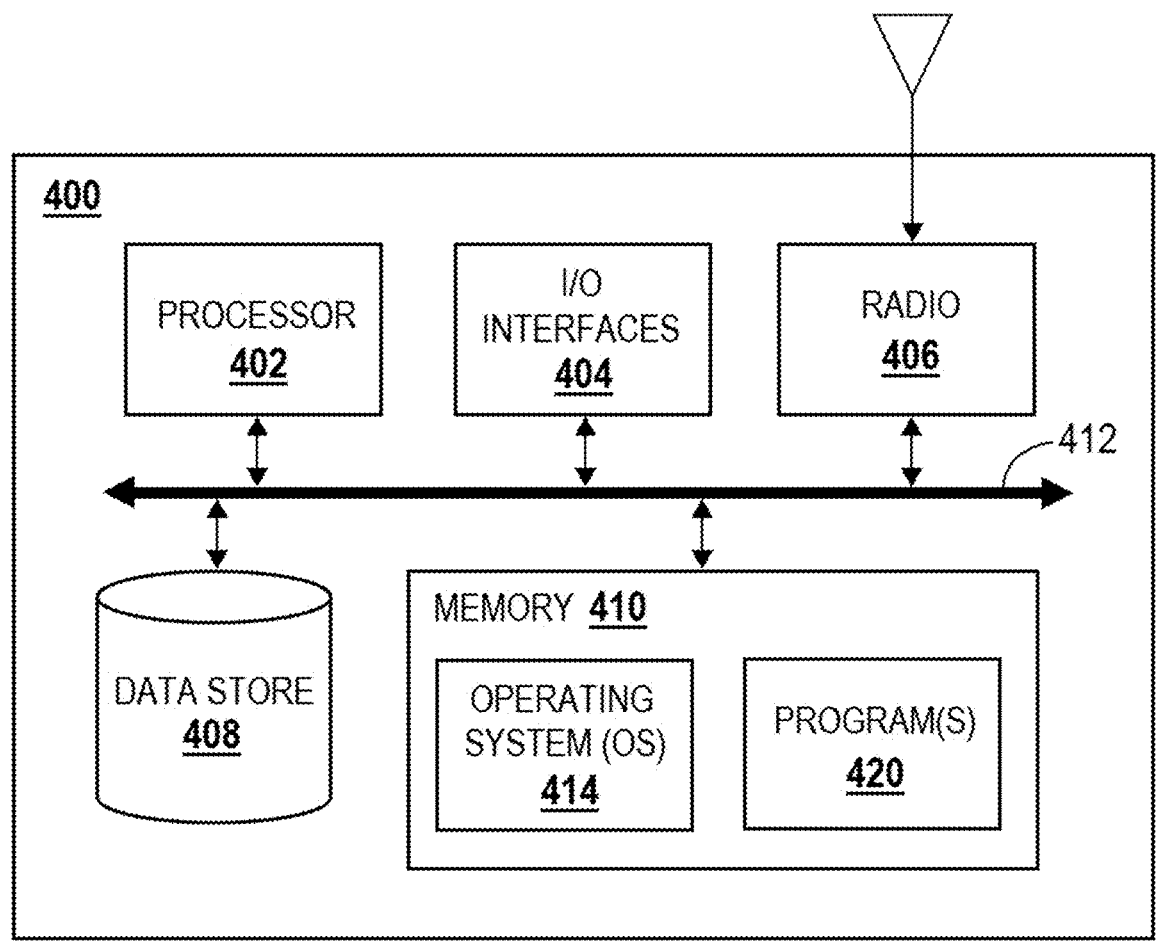
FIG. 3—FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data, such as one or more files 110, 111, and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include an accessing program 112, an authorized handler 113, a user interface (UI) 114, a system service 115, and various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
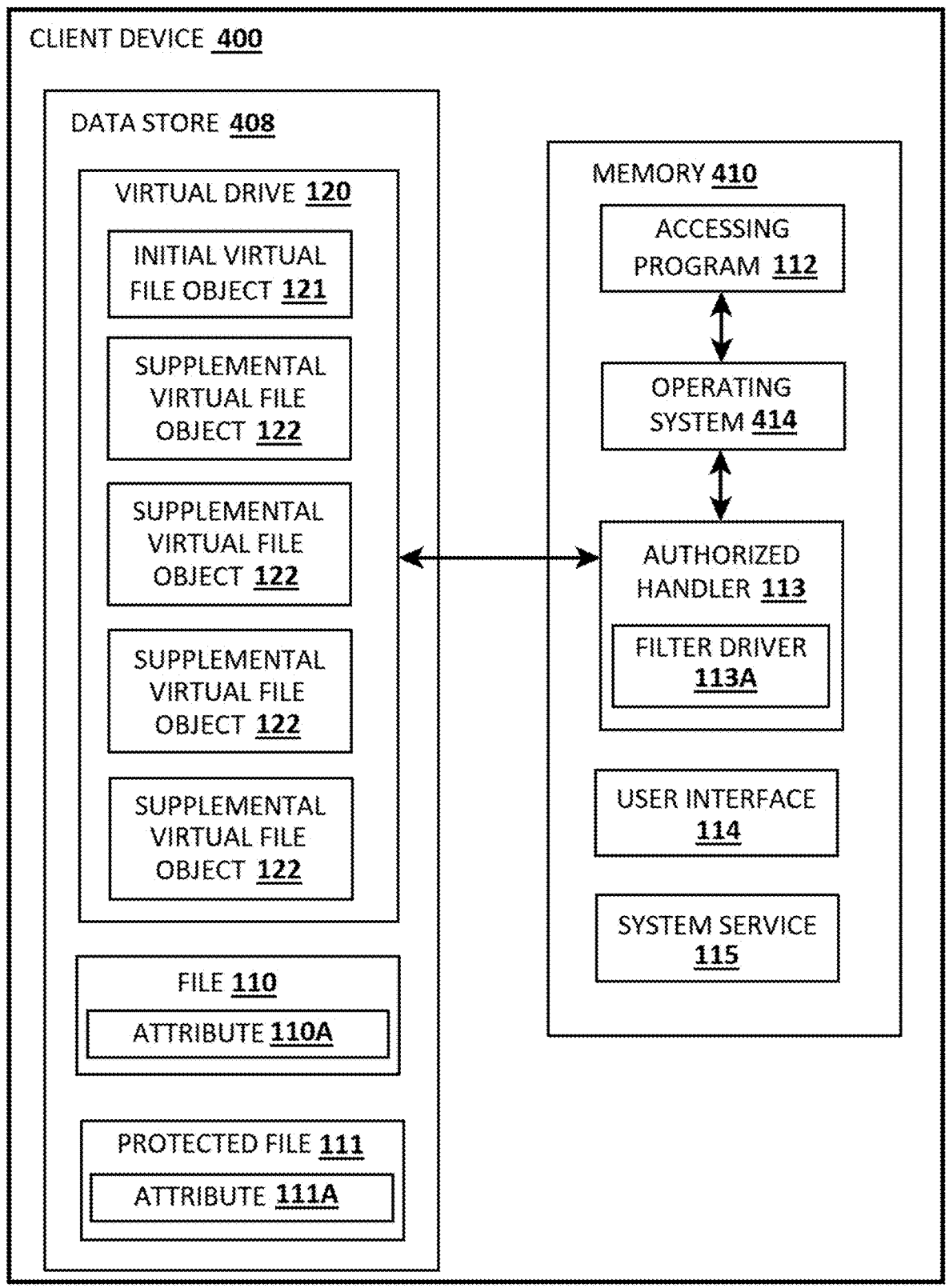
FIG. 4—FIG. 4 depicts a block diagram illustrating some software components and rules engines which of a system for preventing unauthorized file modification by malicious software and the like which may function as software rules engines according to various embodiments described herein.

Referring now to FIG. 4, a block diagram showing some software components and rules engines which may be found in a system 100 (FIG. 1) and which may optionally be configured to run on a server 300 (FIGS. 1 and 2) and/or a client device 400 (FIGS. 1 and 3). In some embodiments, the system 100 may comprise one or more accessing programs 112 and one or more authorized handlers 113 which may be configured to run on one or more client devices 400 and/or servers 300 optionally with data transferred to and from one or more servers 300 in communication with a data store 308 through a network 105. Generally, accessing programs 112 and authorized handlers 113 may access one or more files 110, 111, of a client device 400. A file 110, 111, is an object on a computer that stores data, information, settings, or commands used with a computer program. Example files 110, 111, include text files, data files, directory files, binary and graphic files. A file 110, 111, may contain data and may have one or more attributes 110A, 111A, which describe a specific condition in which the file 110, 111, can exist. Example file attributes 110A, 111A, include, but are not limited to, Archive file attribute, Directory attribute, Hidden file attribute, Read-only file attribute, System file attribute, Volume label attribute, Compressed file attribute, and Encrypted file attribute.

The system 100 may prevent unauthorized file modification to one or more files of a data store 408. These files 111 may be referred to as protected files 111. In some embodiments, the system 100 may identify a file 111 as a protected file 111 by the location, folder, or directory that the file 111 is stored in. For example, files 111 stored in the My Documents folder on a client device 400 may be protected files 111 so that the protected files 111 are identified to the operating system 414 as being owned or operable by the authorized handler 113. In further embodiments, the system 100 may identify a file 111 as a protected file 111 by information provided by a user 101. For example, a user 101 may select one or more files 110, optionally by the location, folder, or directory that the file is stored in, so that the files 110 are identified to the operating system 414 as being protected files 111 that are owned or operable by the authorized handler 113. In preferred embodiments, an authorized handler 113 may identify a file 110 as a protected file 111 if the file 111 is located within a folder, and the authorized handler 113 may use the folder name and/or the folder location in a data store 308, 408, to determine if a file attribute 110A of the file 110 should be modified to create a protected file 111 or otherwise designate the file 110 as a protected file 111.

An accessing program 112 may comprise any program or application which may request access to one or more files 110, 111, of a data store 308 of a server 300 and/or of a data store 408 of a client device 400. For brevity and the remainder of the description, the system 100 and methods described herein will be described as operating and interacting with the files 110, 111, on a data store 408 of a client device 400, however, system 100 and methods described herein may be used on any electronic device, such as a server 300, having one or more files 110, 111, on a data store 308 which are accessible for read and write purposes. Example accessing programs 112 include word processing programs, spreadsheet programs, drawing and photo editing programs, file managers or explorers, file renaming programs, and malicious programs such as ransomware.

Generally, an access program 112 may comprise any program which may attempt to access or modify one or more files 110, 111, in a data store 408 via the generation of an access request. An access request may comprise a request by an accessing program 112 to access the data of a file 110, 111. Example access requests include read requests and write requests. A read request may comprise a ReadFile function, or equivalent, which reads data from the specified file or input/output (I/O) device. A write request may comprise a WriteFile function, or equivalent, which writes data to the specified file or input/output (I/O) device. A write request may include an instruction set which may describe the data of the file 110, 111, that is to be edited, added, deleted, or otherwise changed.

In some embodiments, the authorized handler 113 may comprise or function as handler logic stored in the memory 310, 410 which may be executable by the processor 302, 402, of a server 300 and/or client device 400. The authorized handler 113 may comprise a driver or program or module which may run in Kernel Mode and which may preferably handle all the file access requests in a Windows, Linux, macOS, or other operating system. For example, an authorized handler 113 may comprise a Microsoft Windows filter driver 113A that extends or modifies the function of peripheral devices or supports a specialized device in the personal computer that is inserted into the existing Driver Stack to perform the function of handling all the file access requests. In further embodiments, an authorized handler 113 may include a filter driver and/or other drivers, applications, programs, etc., either alone or in combination. An authorized handler 113 may modify virtual file objects 121, 122. An authorized handler 113 may modify virtual file objects 121, 122. Examples of the term "modify" or "modification" as used herein include but are not necessarily limited to, unless stated otherwise in this document or in the claims, the creation of new virtual file objects 121, 122, editing the data stored in virtual file objects 121, 122 such as writing to virtual file objects 121,122, deleting virtual file objects 121, 122, associating virtual file objects 121, 122, with protected files 111, un-associating virtual file objects 121, 122, from protected files 111, and editing, creating, and deleting file attributes of virtual file objects 121, 122. In still further embodiments, an authorized handler 113 may also perform other operations of the system 100, such as providing merged data, which involve accessing virtual file objects 121, 122. In yet further embodiments, an authorized handler 113 (or other software engine or program) may modify files 111 including the protected files 111 of the system 100. An authorized handler 113 may modify files 110, 111, by creating files 110, 111, editing the data stored in files 110, 111, deleting files 110, 111, associating files 110, 111, with virtual file objects 121, 122, un-associating files 110, 111, from virtual file objects 121, 122, and editing, creating, and deleting file attributes 110A, 111A, of files 110, 111.

In some embodiments, the user interface (UI) 114 may comprise or function as interface logic stored in the memory 310, 410 which may be executable by the processor 302, 402, of a server 300 and/or client device 400. The user interface (UI) 114 may display to the user 101, such as via a display screen of a client device 400, information which may be output by the system 100. The user interface (UI) 114 may comprise a program which may run in User Mode in current user privilege that interacts with user 101. Preferably, one UI 114 process may be running per user 101 of a client device 400. Generally, a UI 114 may provide a computing interface for manipulating files 110, 111, that belong to the current user 101 of a client device 400.

In some embodiments, the system service 115 may comprise or function as system logic stored in the memory 310, 410 which may be executable by the processor 302, 402, of a server 300 and/or client device 400. The system service 115, sometimes referred to as a Daemon, may comprise a computer program that runs as a background process, rather than being under the direct control of an interactive user 101. Generally, the system service 115 may run in System context in User Mode, which means it can access most of the files on the client device 400, regardless of who owns it.

In preferred embodiments, a user interface 114 and a system service 115 may operate in User Mode, while an authorized handler 113 may operate in Kernel Mode. For a User Mode application, an operating system 414 creates a process for the application. The process provides the application with a private virtual address space and a private handle table. Because an application's virtual address space is private, one application cannot alter data that belongs to another application. Each application runs in isolation, and if an application crashes, the crash is limited to that one application. However, all code that runs in Kernel Mode shares a single virtual address space. This means that a Kernel Mode driver is not isolated from other drivers and the operating system itself and thus has access to substantially more files 110, 111, than a User Mode application.

In some embodiments, the system 100 may comprise one or more databases, such as a virtual drive 120, optionally stored on a data store 308, 408, of one or more servers 300 and/or client device 400 accessible to an authorized handler 113. A virtual drive 120 may comprise one or more virtual file objects 121, 122, which may be associated with one or more other files 110, 111, in a data store 408 accessible to the authorized handler 113. A virtual drive 120 may be stored locally on a data store 408 of a client device 400 and/or remotely such as in a data store 308 of a server 300 which may be in communication with the client device 400 running the authorized handler 113. A virtual drive 120 may preferably be hidden and/or encrypted. It should be understood that the described structure of the system database 200 is exemplary in nature, and that in alternative embodiments, the data contained within the system database 200 may be organized in any other way.

A virtual file object 121, 122, may comprise one or more file objects which may be associated with a protected file 111. An initial virtual file object 121 may comprise the first or initial virtual file object created for an initial write request of a protected file protected, while a supplemental virtual file object 122 may comprise any virtual file object created after or subsequently to an initial virtual file object 121 for a write request of a file 111 subsequent to the initial write request of a protected file 111.

An initial virtual file object 121 may comprise a 0 byte file, or other relatively smaller file size, upon initial creation, and then the initial virtual file object 121 may comprise a greater than 0 byte virtual file object (relatively larger file size) that includes the data resulting from at least one write request. Upon initial creation of the virtual file object 121 the virtual file object 121 may generally function as a "placeholder virtual object" which may be, for example, a zero-byte file that is created by the authorized handler 113 prior to receiving any write request from an accessing program. In some embodiments, an initial virtual file object 121 may be a placeholder object prior to the creation of modification data for a protected file 111 that the initial virtual file object 121 is associated with. In further embodiments, an initial virtual file object 121 may be a zero-byte file type of placeholder object prior to the creation of modification data for a protected file 111 that the initial virtual file object 121 is associated with.

A supplemental virtual file object 122 may comprise a virtual file object that may be created after an initial virtual file object 121 for a protected file 111. A supplemental virtual file object 122 may likewise comprise a 0 byte file, or other relatively smaller file size, upon initial creation, and then the supplemental virtual file object 122 may comprise a greater than 0 byte virtual file object (relatively larger file size) that includes the data resulting from at least one write request. A supplemental virtual file object 122 may comprise a second, third, fourth, fifth, sixth, etc., virtual file object for the protected file 111 that the initial virtual file object 121 is associated with. A supplemental virtual file object 122 may be created when there is already one virtual file object 121, 122, mapped to or otherwise associated with the protected file 111 and a new/second, third, fourth, fifth, sixth, etc., write request is made to the protected file 111. For example, an authorized handler 113 may generate a first supplemental virtual file object 122 comprising supplemental merged data after receiving a second write request, a second supplemental virtual file object 122 comprising supplemental merged data after receiving a third write request, a third supplemental virtual file object 122 comprising supplemental merged data after receiving a fourth write request, etc.

Likewise, supplemental virtual file objects 122 may also generally function as a "placeholder virtual object" which may be, for example, a zero-byte file that is created by the authorized handler 113 prior to receiving any write request from an accessing program. In some embodiments, a supplemental virtual file object 122 may be a placeholder object prior to the creation of modification data for a protected file 111 that the supplemental virtual file object 122 is associated with. In further embodiments, a supplemental virtual file object 122 may be a zero-byte file type of placeholder object prior to the creation of modification data for a protected file 111 that the initial virtual file object 121 is associated with. For example, the system 100 may receive a read request of a protected file 111 having a virtual file object 121, 122, with no modification data. The read request may be re-directed to the placeholder virtual object 121, 122, through file attribute 111A setting in the protected file 111. The authorized handler 113 may check the virtual file object 121, 122, (which in this case is functioning as a placeholder type of virtual file object 121, 122) to see if there is modification data or file attribute 111A instructing authorized handler 113 to read data from the protected file 111. Since the virtual file object 121, 122, has no modification data, the authorized handler 113 may return the source data (source data being the data stored by the file 111) from the protected file 111 in response to the read request so that no data may be returned from the placeholder type virtual file object 121, 122.

In preferred embodiments, the system 100 may create a new virtual file object 121, 122, for each write request for a protected file 111 while keeping one or more of the previous virtual file objects 121, 122, for a time period, such as 24 hours, or other time period set by a user preference setting of the system 100. For example, 15 minutes, 1 hour, 6 hours, 12 hours, 24 hours, 36 hours, 48 hours, 72 hours, or other time period that may be between 5 minutes and 10 years.

A virtual file object 121, 122, may comprise modification data which may describe changes to a protected file 111 produced from processing an instruction set from a write request type access request. In some embodiments, a virtual file object 121, 122, may comprise modification data that comprises changes to data of the protected file 111 associated with the virtual file object 121, 122. For example, the virtual file object 121, 122, may simply comprise the changes to the protected file 111 instead of a copy of the entire protected file 111 having the changes resulting from processing a write request. In further embodiments, a virtual file object 121, 122, may comprise the protected file 111 post processing a set of instructions (instruction set) from a write request type access request. For example, the virtual file object 121, 122, may comprise a copy of the entire protected file 111 having the changes resulting from processing a write request. Both initial virtual file objects 121 and supplemental virtual file objects 122 may be both stored on a drive or data store 308, 408, and may both be accessible to the authorized handler 113.

In preferred embodiments, a supplemental virtual file object 122 may be generated for a protected file 111 each time a write request is received for the protected file 111 after the initial virtual file object 121 is created. In this manner, a protected file 111 may be associated with any number of supplemental virtual file objects 122 that may be stored in a virtual drive 120. In the example of FIG. 4, a single protected file 111 is shown in the data store 408 for simplicity and it should be understood that any number of protected files 111 may be managed by the system 100 with one or more of the protected files 111 associated with any number of virtual file objects 121, 122.

Any suitable method for associating a protected file 111 with a virtual file object 121, 122, may be used by the system 100. In some embodiments, a protected file 111 may be associated with a virtual file object 121, 122, by the authorized handler 113 creating a reparse point in an attribute 111A of the protected file 111 which identifies the authorized handler 113 as being the owner of the protected file 111 so that the file contains the reparse point. In this manner, when an access request is processed for the protected file 111, the operating system 414 may hand the access request to the authorized handler 113 for completion. A reparse point is an object in a file system with attributes that activate extended functionality. A tag in the reparse point indicates the location from which external information should be taken and specifies an application associated with that information. In further embodiments, a protected file 111 may be associated with a virtual file object 121, 122, by the authorized handler 113 modifying an attribute 111A of the protected file 111 so that the attribute 111A identifies the protected file 111 as a sparse file which identifies the authorized handler 113 as being the owner of the protected file 111. In still further embodiments, a protected file 111 may be associated with a virtual file object 121, 122, by the authorized handler 113 changing a file attribute 111A of the protected file 111 so that the file attribute 111A is or contains a reparse point. In yet further embodiments, a protected file 111 may be associated with a virtual file object 121, 122, by the authorized handler 113 identifying the protected file 111 as a sparse file which identifies the authorized handler 113 as being the owner of the protected file 111 and/or content identified in the tag of the sparse file. In this manner, when an access request is processed for the protected file 111, the operating system 414 may hand the access request to the authorized handler 113 for completion. A sparse file is a type of computer file that attempts to use file system space more efficiently when the file itself is partially empty. This is achieved by writing brief information (metadata) representing the empty blocks to disk instead of the actual "empty" space which makes up the block, using less disk space. The full block size is written to disk as the actual size only when the block contains "real" (non-empty) data. When reading sparse files, the file system transparently converts metadata representing empty blocks into "real" blocks filled with zero bytes at runtime. The application is typically unaware of this conversion.

In some embodiments, a protected file 111 may be unassociated from a first virtual file object 121, 122, and the protected file 111 may be associated with a second virtual file object 122 so that the supplemental merged data of the second virtual file object 122 is returned in responses to a read request of the protected file 111 by the authorized handler 113. For example, a protected file 111 may be unassociated from an initial virtual file object 121 and then the protected file 111 may be associated with a supplemental virtual file object 122 so that the supplemental merged data of the supplemental virtual file object 122 may be returned in responses to a subsequent read request of the protected file 111. In further embodiments, the virtual file object 121, 122, may be unassociated by being moved to a recycle-bin or may be otherwise removed or deleted, and may be replaced with a, optionally zero-byte, virtual file object 121, 122.

In some embodiments, the content of a virtual file object 121, 122, such as the modification data, may be moved or written to the source protected file 111 by the authorized handler 113. For example, a virtual file object 121, 122, may remain in the data store 308, 408, but may become a zero-byte file or placeholder file. In some embodiments, the authorized handler 113 may transfer or merge data from a virtual file object 121, 122, to modify the protected file 111 so that the resulting virtual file object 121, 122, may be a zero-byte file or placeholder file. Note that "modify" here may be either fully replacing the protected file 111 or changing or writing to the file to include the merged data.

Figure 5:
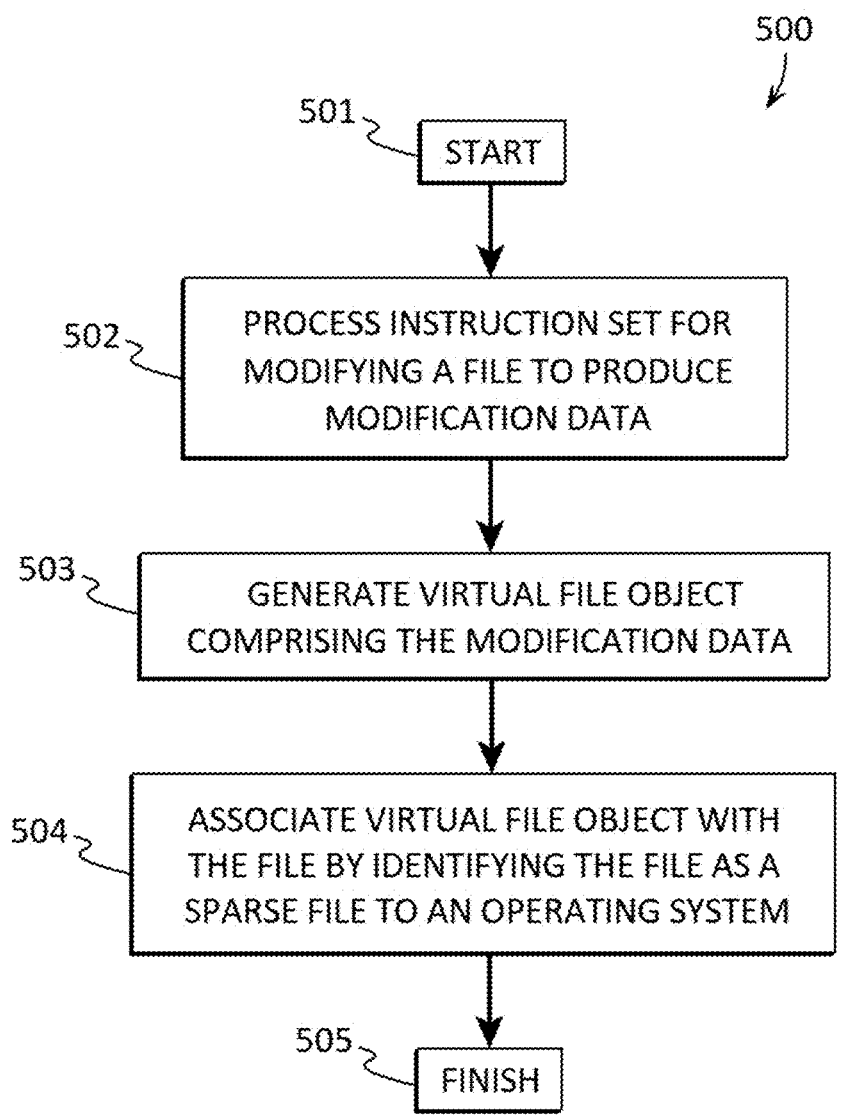
FIG. 5—FIG. 5 illustrates a block diagram of an example of a computer-implemented cyber security method for generating a virtual file object according to various embodiments described herein.

FIG. 5 shows a block diagram of an example of a computer-implemented cyber security method for generating a virtual file object ("the method") 500 according to various embodiments described herein. In some embodiments, the method 500 may be used to generate one or more virtual file objects 121, 122, which may store changes that would be produced to a protected file 111 from processing a set of instructions so that the changes may be produced and/or stored without altering the protected file 111. One or more steps of the method 500 may be performed by an accessing program 112, authorized handler 113, user interface 114, system service 115, or other program running on an operating system 414 which may be executed by a computing device processor, such as a processor 302 (FIG. 2) and/or a processor 402 (FIG. 3).

The method 500 may start 501 and an instruction set for modifying a protected file 111 may be processed to produce modification data in step 502. In some embodiments, the instruction set for modifying a protected file 111 may be contained in an access request produced by an accessing program 112. For example, a write request for the protected file 111 may be generated by an accessing program 112 that may be or may contain a WriteFile function having write instructions. The authorized handler 113 may access the data of the protected file 111 and perform the instructions to generate or produce modification data. In some embodiments, the modification data may comprise changes to data of the protected file 111. For example, the modification data may only include changes to the data of the protected file 111 resulting from processing the instructions instead of having the entire data of the protected file 111 including both the changes and the unchanged data or unmodified data. In other embodiments, the modification data may comprise the protected file 111 post processing the set of instructions (instruction set). For example, the modification data may comprise a copy of the entire protected file 111 having the changes resulting from processing the set of instructions.

Next in step 503, a virtual file object 121, 122 comprising the modification data may be generated by the authorized handler 113. In some embodiments, the authorized handler 113 may generate virtual file object 121, 122, by storing the modification data in a data object on the virtual drive 120 or other suitable storage location. In preferred embodiments, the virtual file object 121, 122, may be associated with the protected file 111 by the authorized handler 113 with any suitable method, such as by identifying the protected file 111 as a sparse file pointing to the virtual file object 121, 122, or by adding a reparse point to the protected file 111 pointing to the virtual file object 121, 122.

In step 504, the virtual file object 121, 122, may be associated with the protected file 111 by identifying the protected file 111 as a sparse file. In some embodiments, the protected file 111 may be associated with the virtual file object 121, 122, by the authorized handler 113 adding content to a tag of the protected file 111 which identifies the protected file 111 as a sparse file and which points to the virtual file object 121, 122. In further embodiments, the protected file 111 may be associated with the virtual file object 121, 122, by the authorized handler 113 identifying the protected file 111 as a sparse file with data that identifies the authorized handler 113 as being the owner of the protected file 111 and with data that points to the virtual file object 121, 122. After step 504, the method 500 may finish 505.

In preferred embodiments, the method 500 may be performed each time an instruction set for a protected file 111 is processed so that the protected file 111 may have any number of virtual file objects 121, 122, associated with it. In further preferred embodiments, a set number of virtual file object 121, 122, may be stored or retained for a protected file 111. When a set number of virtual file objects 121, 122, associated with the protected file 111 are generated, the oldest virtual file object 121, 122, may be deleted. For example, only the seven most recent virtual file objects 121, 122, for a protected file 111 may be stored in a virtual drive 120, so that when a new supplemental virtual file object 122 is created, the oldest virtual file object 121, 122, may be deleted, archived, or otherwise removed from the virtual drive 120. In still further preferred embodiments, after a set number of virtual file objects 121, 122, associated with the protected file 111 are generated, the modification data of the oldest virtual file object 121, 122, may be written into the protected file 111 so that the modification data is incorporated, overwritten or otherwise combined with the data of the protected file 111. For example, after an eighth virtual file object 121, 122, for a protected file 111 is created and stored, the modification data of the initial virtual file object 121 may be written into the protected file 111 so that the modification data of the initial virtual file object 121 is incorporated, overwritten or otherwise combined with the data of the protected file 111.

Figure 6:
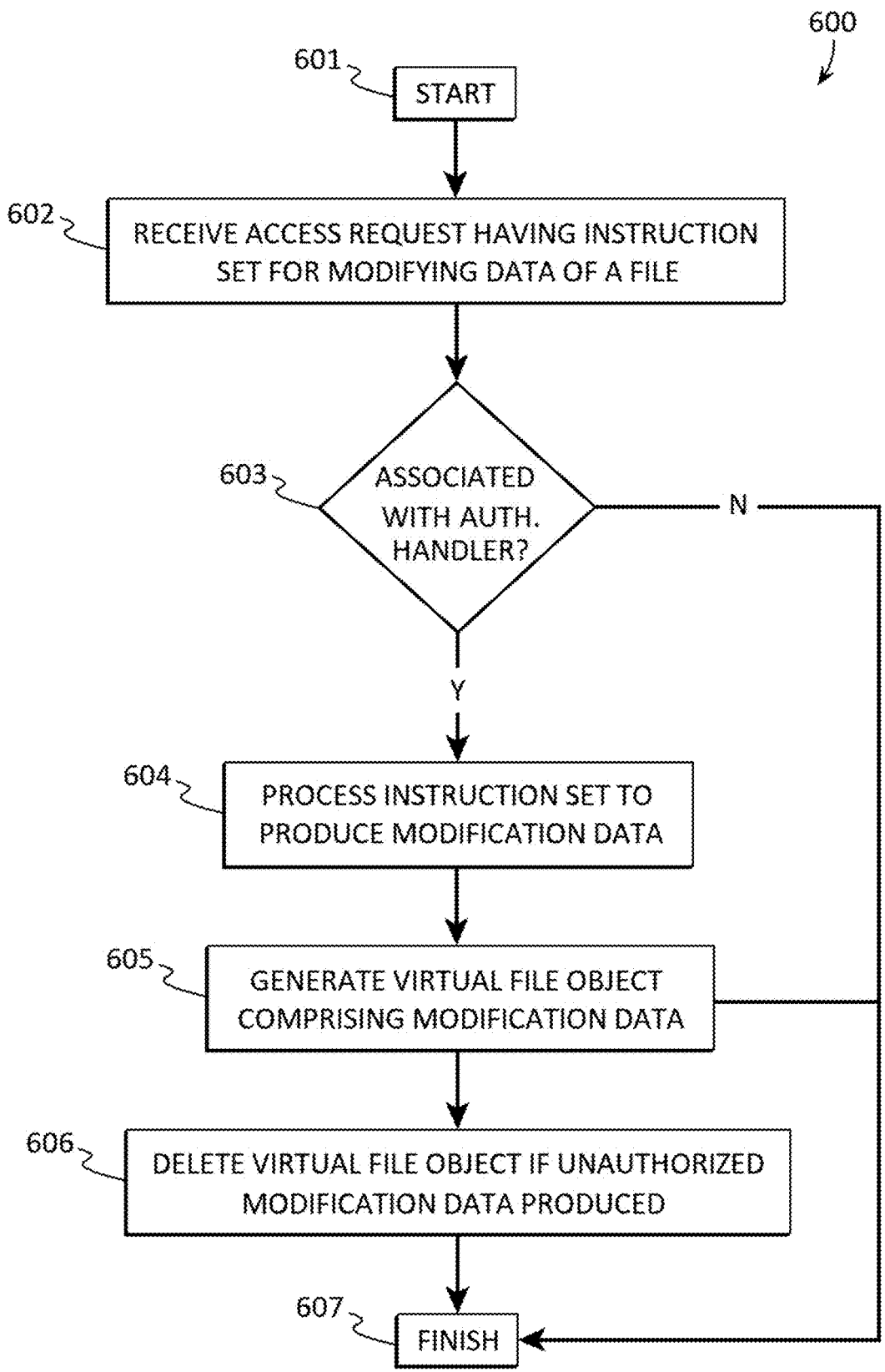
FIG. 6—FIG. 6 shows a block diagram of an example of a computer-implemented cyber security method for preventing unauthorized file modification to a file according to various embodiments described herein.

FIG. 6 depicts a block diagram of an example of a computer-implemented cyber security method for preventing unauthorized file modification to a file ("the method") 600 according to various embodiments described herein. In some embodiments, the method 600 may be used to prevent unauthorized file modification to one or more files 111 (FIG. 4) in a data store 308 (FIG. 2), 408 (FIG. 3), of electronic devices, such as client devices 400 and servers 300. Unauthorized file modification may describe any change to a protected file 111 that may ultimately be undesirable to a user 101 immediately after the change or at some later point in time after the change. The method 600 may generate one or more virtual file objects 121, 122, which may store changes produced to a protected file 111 and which may also be used to revert the protected file 111 to a previous state. The method 600 prevents unauthorized modifications to files 111 by storing changes that would be produced to a file as one or more virtual file objects 121, 122, while leaving the data of the protected file 111 intact or unaltered. One or more steps of the method 600 may be performed by an accessing program 112, authorized handler 113, user interface 114, system service 115, or other program running on an operating system 414 which may be executed by a computing device processor, such as a processor 302 (FIG. 2) and/or a processor 402 (FIG. 3).

The method 600 may start 601 and an access request may be received from a program 420 of a client device 400, such as an accessing program 112, having an instruction set for modifying data of the protected file 111 as shown in block 602. In some embodiments, the access request may be received by an authorized handler 113 directly from the accessing program 112. In other embodiments, the access request may be received by an authorized handler 113 from the accessing program 112 after being forwarded to the authorized handler 113 by the operating system, file system, or one or more other programs.

In decision block 603, it may be determined if the protected file 111 is associated with the authorized handler 113. Optionally, the operating system 414, system service 115, file system, or other software suitable for processing access requests may determine if the protected file 111 is associated with the authorized handler 113. In some embodiments, the protected file 111 may be determined to be associated with the authorized handler 113 if the protected file 111 has a reparse point associated with the file 111. In further embodiments, the protected file 111 may be determined to be associated with the authorized handler 113 if the protected file 111 is identified by the operating system 414 as a sparse file which identifies the authorized handler 113 as being the owner of the protected file 111 and/or content identified in the tag of the sparse file. In still further embodiments, the protected file 111 may be determined to be associated with the authorized handler 113 if the protected file 111 is accessible only to the authorized handler 113. If the protected file 111 is determined to be associated with the authorized handler 113, the method 600 may proceed to step 604. If the protected file 111 not determined to be associated with the authorized handler 113, the method 600 may finish 607 and the access request may proceed to method 700.

In step 604, the instruction set of the access request may be processed to produce modification data. In some embodiments, the access request may be a write request for the protected file 111 and the access request may be or may contain a WriteFile function. Generally, a WriteFile function contains a set of instructions which when processed causes data to be written to a file or input/output (I/O) device specified by the instructions. The authorized handler 113 may then access the data of the protected file 111 and perform the instructions of the access request, such as write request instructions on the data of the protected file 111 to generate or produce modification data. In some embodiments, the modification data may comprise changes to data of the protected file 111. For example, the modification data may only include changes to the data of the file 11 resulting from processing the instructions instead of having the entire data of the protected file 111 including both the changes and the unchanged data or unmodified data. In other embodiments, the modification data may comprise the protected file 111 post processing the set of instructions (instruction set). For example, the modification data may comprise a copy of the entire protected file 111 having the changes resulting from processing the set of instructions.

Next in step 605, a virtual file object 121, 122 comprising the modification data may be generated by the authorized handler 113. In some embodiments, the authorized handler 113 may generate virtual file object 121, 122, by storing the modification data in a data object on the virtual drive 120 or other suitable storage location. In preferred embodiments, the virtual file object 121, 122, may be associated with the protected file 111 by the authorized handler 113 with any suitable method, such as by identifying the protected file 111 as a sparse file pointing to the virtual file object 121, 122, or by adding a reparse point to the protected file 111 pointing to the virtual file object 121, 122. Optionally, after step 605, the method may finish 607.

Optionally, the method 600 may include step 606 in which the virtual file object 121, 122, may be deleted if unauthorized modification data is produced from processing the instructions set in step 604. Preferably, step 606 may be performed automatically by the authorized handler 113, user interface 114, system service 115, or other program, or optionally by user 101 request. In some embodiments, unauthorized modification data may comprise encryption of the data of the protected file 111, such as is produced from instructions sets of malware and ransomware. In other embodiments, unauthorized modification data may result from processing the instructions of a user 101 directed access request that the user 101 later determines is undesirable. For example, if the user 101 accidentally directs an accessing program 112 to generate an access request that has an instruction set for deleting the contents of the protected file 111, the virtual file object 121, 122, generated for that request may be deleted. After optional step 606, the method may finish 607.

Figure 7:
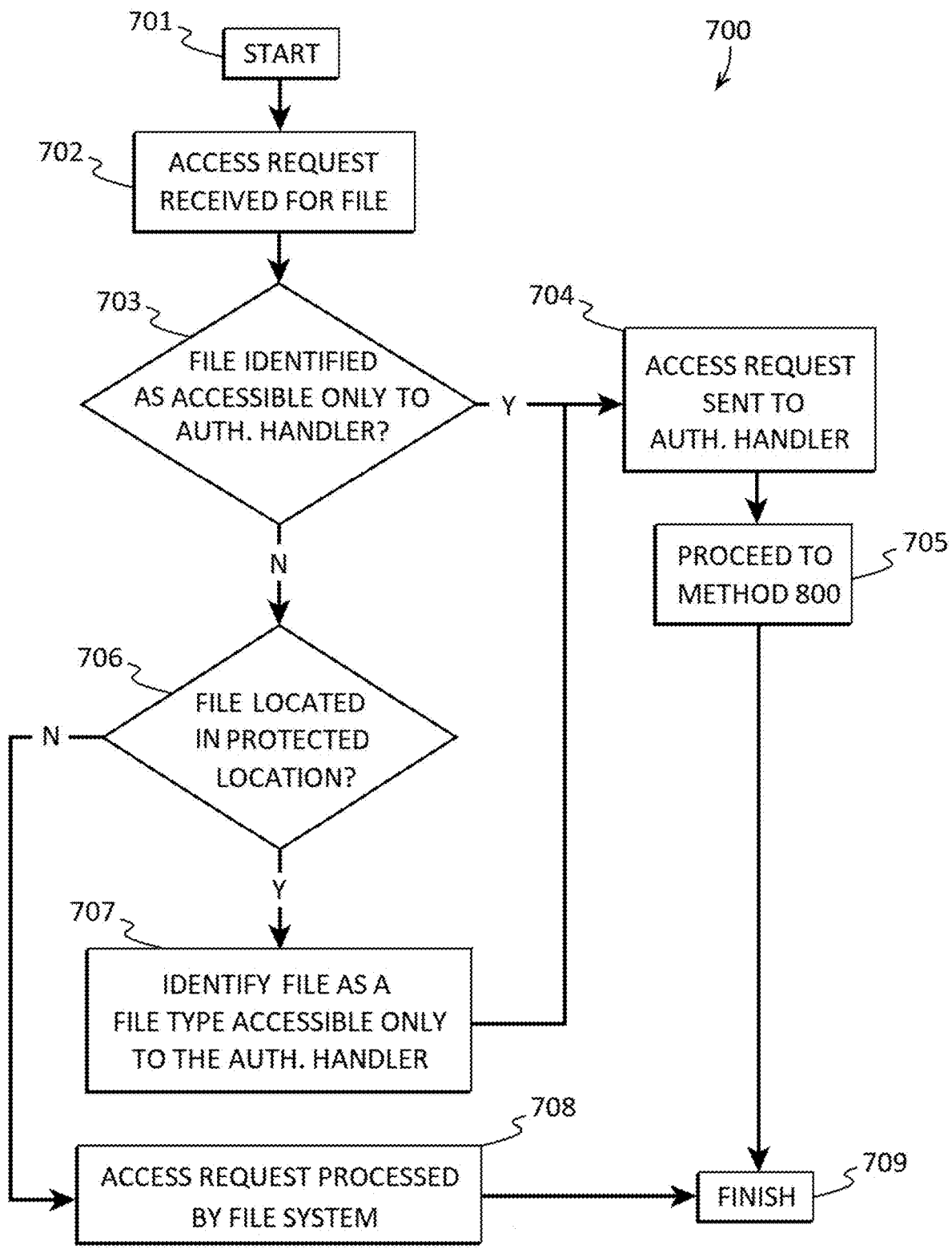
FIG. 7—FIG. 7 depicts a block diagram of an example of a computer-implemented method for identifying how to process an access request for a protected file according to various embodiments described herein.

FIG. 7 shows a block diagram of an example of a computer-implemented method for identifying how to process access requests for files in the system 100 ("the method") 700 according to various embodiments described herein. In some embodiments, the method 700 may be used to identify if an access request for a file 110, 111, is to be processed by an authorized handler 113, an operating system 414, or another program running on an operating system 414. One or more steps of the method 700 may be performed by an accessing program 112, authorized handler 113, user interface 114, system service 115, or other program running on an operating system 414 which may be executed by a computing device processor, such as a processor 302 (FIG. 2) and/or a processor 402 (FIG. 3).

In some embodiments, the method 700 may start 701 and an access request for digital file 110, 111, may be received in step 702. The access request may be generated by an accessing program 112 and may be provided to the operating system 414, system service 115, file system, or other software suitable for processing access requests. For example, an accessing program 112 may comprise Microsoft Word or ransomware, and the accessing program 112 may send an access request for a file 110, 111, such as Invoice.doc to the operating system 414.

The method 700 may then proceed to decision block 703 and the operating system 414, system service 115, file system, or other software suitable for processing access requests may determine if the file 110, 111, is identified as accessible only to the authorized handler 113 (therefore a protected file 111). In some embodiments, the file 110, 111, may be identified as accessible only to the authorized handler 113 if the file 110, 111, has a reparse point associated with the authorized handler 113. In further embodiments, the file 110, 111, may be identified as accessible only to the authorized handler 113 if the file 110, 111, is identified by the operating system 414 as a sparse file which identifies the authorized handler 113 as being the owner of the file 111 and/or content identified in the tag of the sparse file. If the file is determined to be accessible only to the authorized handler 113 (therefore being a protected file 111), the method 700 may proceed to step 704.

In step 704, the access request may be sent to the authorized handler 113 for processing and the method 700 may proceed to method 800 in step 705 and finish 709.

If the file 110, 111, is not determined to be accessible only to the authorized handler 113, the method 700 may proceed to decision block 706 and the operating system 414, system service 115, file system, or other software suitable for processing access requests may determine if the file 110, 111, is located in protected location. For example, if the file 110, 111, is stored in the My Documents folder on a client device 400 the operating system 414, system service 115, file system, or other software suitable for processing access requests may determine the file 110, 111, to be a protected file 111 so that the protected files 111 are identified to the operating system 414 as being owned or operable by the authorized handler 113. If the file 111 is located in protected location, the method 700 may proceed to step 707.

In step 707, the file 111 may be identified as a file type accessible only to the authorized handler 113. In some embodiments, the file 111 may be identified as accessible only to the authorized handler 113 by adding a reparse point associated with the authorized handler 113 to the file 111. In further embodiments, the file 111 may be identified as accessible only to the authorized handler 113 if the file 111 by modifying an attribute 111A of the file 111 so that the file is identified by the operating system 414 as a sparse file which identifies the authorized handler 113 as being the owner of the file 111 and/or content identified in the tag of the sparse file. Upon completion of step 707, the method 700 may then proceed to step 704.

If the file 110 is not located in protected location, the method 700 may proceed from decision block 706 to step 708 and the access request may be processed by the file system or other suitable software running on the operating system 414. In further embodiments, the access request may be forwarded to the file system or other suitable software running on the operating system 414 by the system service 115. After step 708, the method 700 may finish 709.

Figure 8:
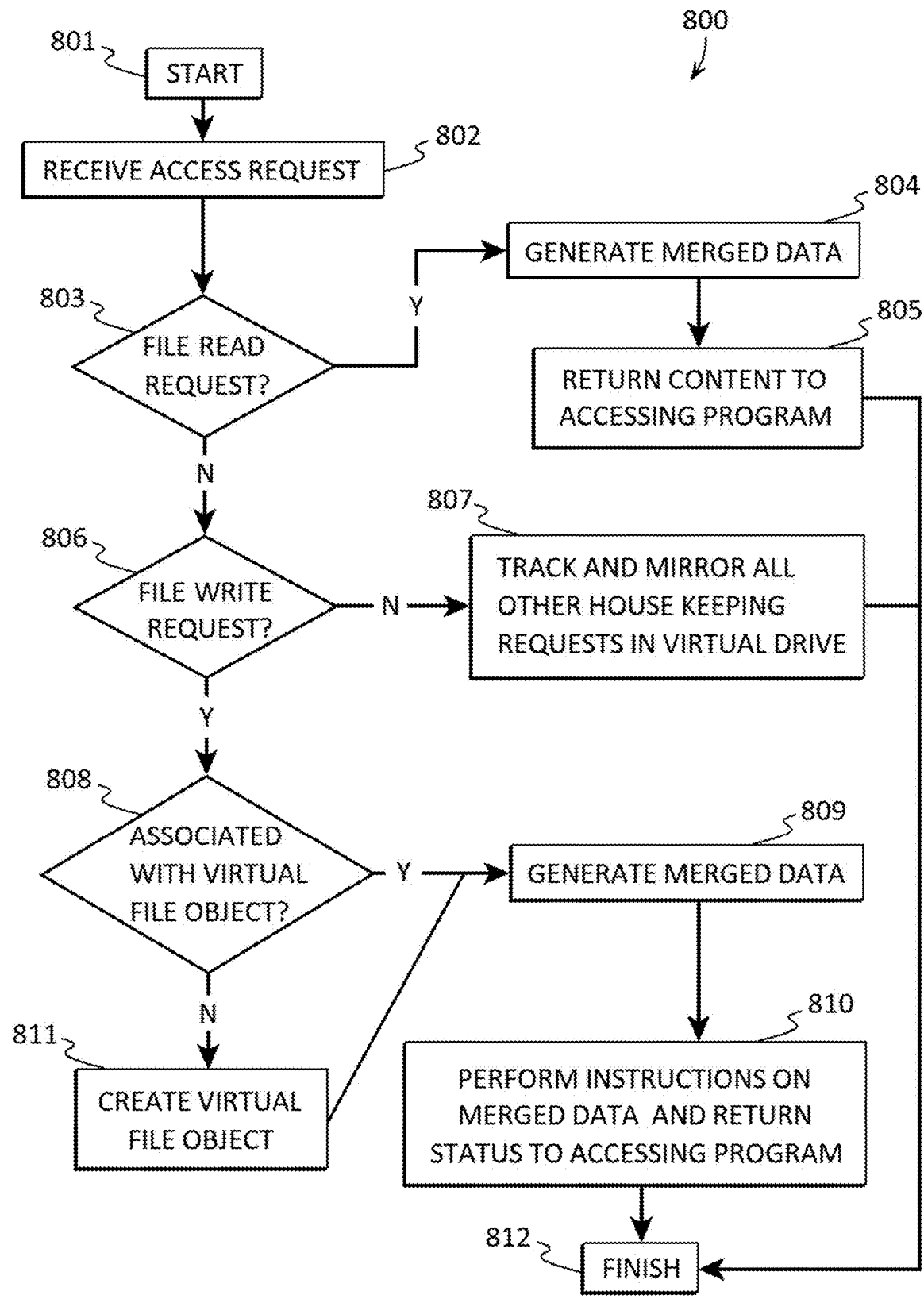
FIG. 8—FIG. 8 illustrates a block diagram of an example of a computer-implemented method for processing an access request for a protected file according to various embodiments described herein.

FIG. 8 illustrates a block diagram of an example of a computer-implemented method for processing an access request for a protected file 111 ("the method") 800 according to various embodiments described herein. In some embodiments, the method 800 may be used to process an access request for a protected file 111 that is owned or operable by an authorized handler 113 by an operating system 414 or program running on an operating system 414. One or more steps of the method 800 may be performed by an accessing program 112, authorized handler 113, user interface 114, system service 115, or other program running on an operating system 414 which may be executed by a computing device processor, such as a processor 302 (FIG. 2) and/or a processor 402 (FIG. 3).

The method 800 may start 801 and an access request for a protected file 111 generated by an accessing program 112 may be received in step 802. In some embodiments, the access request may be received by an authorized handler 113 upon completion of steps 704 and 705 of method 700. In further embodiments, an access request may be provided to an authorized handler 113 via any other process or application running on a client device 400 having an authorized handler 113.

In decision block 803, the authorized handler 113 may determine if the access request is a read request for the protected file 111. In some embodiments, the authorized handler 113 may determine if the access request is a read request for the protected file 111 by determining if the access request is or contains a ReadFile function. Generally, a ReadFile function contains a set of instructions which when processed causes data to be read from a file or input/output (I/O) device specified by the instructions, and these reads may occur at the position specified by the file pointer if supported by the device. In alternative embodiments, the authorized handler 113 may determine if the access request is as a read request for the protected file 111 by reading the instructions of the access request which may be common to the operating system 414 which the authorized handler 113 is running on.

If the access request is a read request for the protected file 111, the method may proceed to step 804 and the authorized handler 113 may generate merged data. In some embodiments, the authorized handler 113 may read the content from the protected file 111 and determine if the protected file 111 is associated with a virtual file object 121, 122. In further embodiments, the protected file 111 may be associated with a virtual file object 121, 122, by the protected file 111 being identified, optionally by the operating system 414, as a sparse file that points to the virtual file object(s) 121, 122. In still further embodiments, the protected file 111 may be associated with a virtual file object 121, 122, by the protected file 111 containing a reparse point the that points to the virtual file object(s) 121, 122. The authorized handler 113 may then retrieve the virtual file object(s) 121, 122, from the virtual drive 120 or other location, and the authorized handler 113 may generate merged data by combining the data of the protected file 111 with the data of the virtual file object(s) 121, 122, so that the data of the virtual file object(s) 121, 122, supersedes data of the protected file 111.

The method 800 may then proceed from step 804 to step 805 in which the content having the merged data may be returned to the accessing program 112 that created the access request and then the method 800 may finish 812.

If the access request is not a read request for the protected file 111, the method may proceed to decision block 806 and the authorized handler 113 may determine if the access request is a write request for the protected file 111. In some embodiments, the authorized handler 113 may determine if the access request is a write request for the protected file 111 by determining if the access request is or contains a Write-File function. Generally, a WriteFile function contains a set of instructions which when processed causes data to be written to a file or input/output (I/O) device specified by the instructions. In alternative embodiments, the authorized handler 113 may determine if the access request is as a write request for the protected file 111 by reading the instructions of the access request which may be common to the operating system 414 which the authorized handler 113 is running on.

If the access request is not a write request for the protected file 111, the method may proceed to step 807 and the authorized handler 113 may track and mirror all other housekeeping requests in the virtual drive 120, preferably in virtual file object(s) 121, 122, which may include: read/write meta data of the protected file 111, such as file size, date, author, etc.; read/write file attributes 111A of the protected file 111, such as read-only flag, hidden, system, compressed, etc.; and read/write security objects of the protected file 111, such as user and group permission to read, write, execute, and the like. Upon completion of step 807, the method 800 may finish 812.

If the access request is a write request for the protected file 111, the method may proceed to decision block 808 and the authorized handler 113 may determine if the protected file 111 is associated with a virtual file object(s) 121, 122. For example, the authorized handler 113 may determine if the protected file 111 has a reparse point containing a link to virtual file object(s) 121, 122, that are preferably stored in the virtual drive 120.

If the protected file 111 is associated with a virtual file object(s) 121, 122, the method 800 may proceed to step 809 and the authorized handler 113 may generate merged data. In some embodiments, the authorized handler 113 may retrieve the virtual file object(s) 121, 122, from the virtual drive 120 or other location, and the authorized handler 113 may generate merged data by combining the data of the protected file 111 with the data of the virtual file object(s) 121, 122, so that the data of the virtual file object(s) 121, 122, supersedes data of the protected file 111.

In step 810, the authorized handler 113 may perform the write instructions of the access request on the merged data and then return the status to the accessing program. In preferred embodiments, the authorized handler 113 may perform the write instructions of the access request on the merged data and then save the results as a supplemental virtual file object 122 in the virtual drive 120.

If the authorized handler 113 determines that the protected file 111 is not associated with a virtual file object(s) 121, 122, in decision block 808, the method 800 may proceed to step 811 and the authorized handler 113 may create a virtual file object(s) 121, 122, for the protected file 111. In some embodiments, the authorized handler 113 may allocate storage for the virtual file object(s) 121, 122, of the protected file 111 in the virtual drive 120 and then associate the virtual file object(s) 121, 122, with the protected file 111. For example, the authorized handler 113 may associate the virtual file object(s) 121, 122, with the protected file 111 by adding a reparse point to the protected file 111 containing a link to virtual file object(s) 121, 122. The method 800 may then proceed to step 809, and following step 810 the method 800 may finish 812.

Referring now to methods 500, 600, 700, 800, 900, 1000, and 1100, in preferred embodiments, a virtual file object 121, 122, may be created and associated with a protected file 111 each time an access request for the protected file 111 is received by the authorized handler 113 with each virtual file object 121, 122, comprising modification data which describes changes to the protected file 111 that would result from processing an instruction set of the respective access request. Preferably, when a new access request is received for the protected file 111, the authorized handler 113 may merge the modification data of the most recent virtual file object 121, 122, with the data of the protected file 111 to produce merged data in which the merged data describes the modification data of the most recent virtual file object 121, 122, resulting from processing the instruction set of the new access request, incorporated with the data of the protected file 111. The instruction set of the new access request may then be performed on the merged data of the most recent virtual file object 121, and another supplemental virtual file object 122 may be created using the modification data resulting from the new access request. Optionally, when a new access request is received for the protected file 111, the authorized handler 113 may merge the modification data of a virtual file object 121, 122, that was selected by the user 101 with the data of the protected file 111 to produce merged data in which the merged data describes the modification data of the selected virtual file object 121, 122, incorporated with the data of the protected file 111.

In further embodiments, a first access request for a protected file 111 may be received from a program, such as an accessing program 112, by the authorized handler 113. The first access request may have a first instruction set for modifying data of the file. If the protected file 111 is associated with the authorized handler 113, the authorized handler 113 may process the first instruction set to produce first modification data, and the authorized handler 113 may generate a virtual file object 121, 122, such as an initial virtual file object 121 comprising the first modification data. Upon receiving a second access request, such as the second access request being or containing a read request, for the protected file 111 from an accessing program 112, the authorized handler 113 may return first merged data to the accessing program 112. The first merged data may describe the first modification data incorporated with the data of the protected file 111. Optionally, the authorized handler 113 may overwrite the data of the protected file 111 with the first merged data. Preferably, the authorized handler 113 may overwrite the data of the protected file 111 with the first merged data after the expiration of a time period, such as 24 hours, seven days, one month, one year, or any other time period.

Upon receiving a third access request having a second instruction set for modifying data of the file, such as the third access request being or containing a write request, for the protected file 111 from an accessing program 112, the authorized handler 113 may process the second instruction set with the first modification data to produce second modification data, and the authorized handler 113 may generate a subsequent virtual file object, such as a supplemental virtual file object 122 comprising the second modification data. Upon receiving a fourth access request, such as the fourth access request being or containing a read request, for the protected file 111 from an accessing program 112, the authorized handler 113 may return second merged data to the accessing program 112. The second merged data may describe the second modification data of the most recent virtual file object 121, 122, incorporated with the data of the protected file 111. Optionally, the authorized handler 113 may overwrite the data of the protected file 111 with the second merged data. Preferably, the authorized handler 113 may overwrite the data of the protected file 111 with the second merged data after the expiration of a time period, such as 24 hours, seven days, one month, one year, or any other time period. In further preferred embodiments, after a set number of virtual file objects 121, 122, associated with the protected file 111 are generated, the oldest virtual file object is deleted. In still further preferred embodiments, after a set number of virtual file objects 121, 122, associated with the protected file 111 are generated, the modification data of the oldest virtual file object 121, 122 may be written into the protected file 111.

Figure 9:
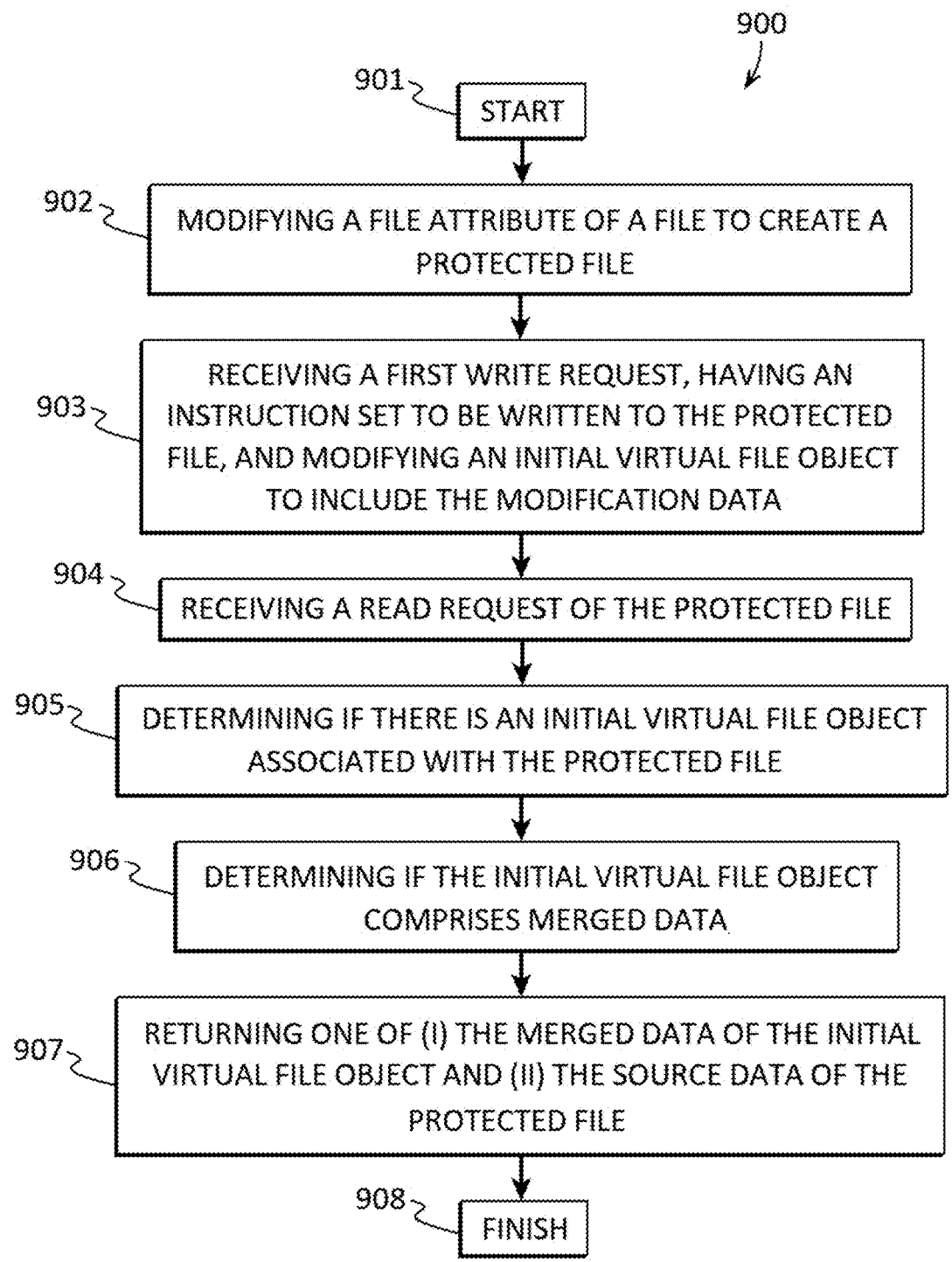
FIG. 9—FIG. 9 shows a block diagram of an example of a computer-implemented method for providing data of a protected file in response to an access request for the protected file according to various embodiments described herein.

FIG. 9 depicts a block diagram of an example of a computer-implemented method for providing data of a protected file in response to an access request for the protected file ("the method") 900 according to various embodiments described herein. In some embodiments, the method 900 may be used to process an access request for a protected file 111 that is owned or operable by an authorized handler 113 by an operating system 414 or program running on an operating system 414. One or more steps of the method 900 may be performed by an accessing program 112, authorized handler 113, user interface 114, system service 115, or other program running on an operating system 414 which may be executed by a computing device processor, such as a processor 302 (FIG. 2) and/or a processor 402 (FIG. 3).

The method 900 may start 901 a file attribute 110A of a file 110 may be modified by an authorized handler 113 to create a protected file 111 in step 902. In some embodiments, an authorized handler 113 may modify a file attribute 110A of a file 110 to create (or convert the file 110 into) a protected file 111. Preferably, the modified file attribute 111A may be configured to instruct a computer processor to permit write access of the (now) protected file 111 only by the authorized handler 113 and to deny write access of the protected file 111 by other programs.

In step 903, a first write request may be received by the system 100, and the first write request may have an instruction set to be written to the protected file 111. As the write request is unable to be written to the protected file 111, it is instead transferred to the authorized handler 113 which may modify an initial virtual file object 121 to include the instruction set from the first write request, and the initial virtual file object 121 may comprise merged data that includes source data from the protected file 111 and modification data from the instruction set of the write request. In some embodiments, an authorized handler 113 may modify an initial virtual file object 121 to include the instruction set from the first write request by creating the initial virtual file object 121 in a data store 308, 408, and then adding the modification data to the initial virtual file object 121. In further embodiments, an authorized handler 113 may modify an initial virtual file object 121 to include the instruction set from the first write request by modifying an existing initial virtual file object 121 in a data store 308, 408, and then adding the modification data to the initial virtual file object 121.

In step 904, a read request of the protected file 111 may be received by the system 100 from a program.

In step 905, the system 100, and preferably the authorized handler 113, may determine if there is an initial virtual file object 121 associated with the protected file 111. In some embodiments, the system 100 may utilize a matrix or program to match a file name or file id number of the protected file 111 with the file name or file id number of an initial virtual file object 121 to determine if there is an initial virtual file object 121 associated with the protected file 111. In further embodiments, the system 100 may utilize a lookup table which maps a protected file 111 with one or more virtual objects 121, 122. For example, the mapping may be done with filename or file ID. In these embodiments, the authorized handler 113 is able to associate or de-associate protected files 111, with virtual file objects 121.

In step 906, the system 100, and preferably the authorized handler 113, may determine if an initial virtual file object 121 associated with the protected file 111 comprises merged data. In some embodiments, an authorized handler 113, may determine that an initial virtual file object 121 comprises merged data if there is modification data stored in the initial virtual file object 121. In further embodiments, an authorized handler 113, may determine that an initial virtual file object 121 does not comprise merged data if the file is a 0 byte file or other relatively smaller sized file.

In step 907, the system 100, and preferably the authorized handler 113, may return one of: (i) the merged data of the initial virtual file object or (ii) the source data of the protected file in response to the access, such as to the program that generated the access request. The return of the data may be based on the determination of the initial virtual file object comprising merged data in step 906. In some embodiments, the authorized handler 113 may return the merged data of the initial virtual file object 121 in response to the read request when both of the following conditions are true (i) an initial virtual file object 121 is present and associated with the protected file 111 and (ii) the initial virtual file object 121 comprises merged data. In further embodiments, the authorized handler 113 may return the source data of the protected file 111 in response to the read request when at least one of the following conditions are true (i) no initial virtual file object 121 is associated with the protected file 111 and (ii) the initial virtual file object 121 does not comprise merged data.

Optionally, after step 907 the method may finish 908.

Figure 10:
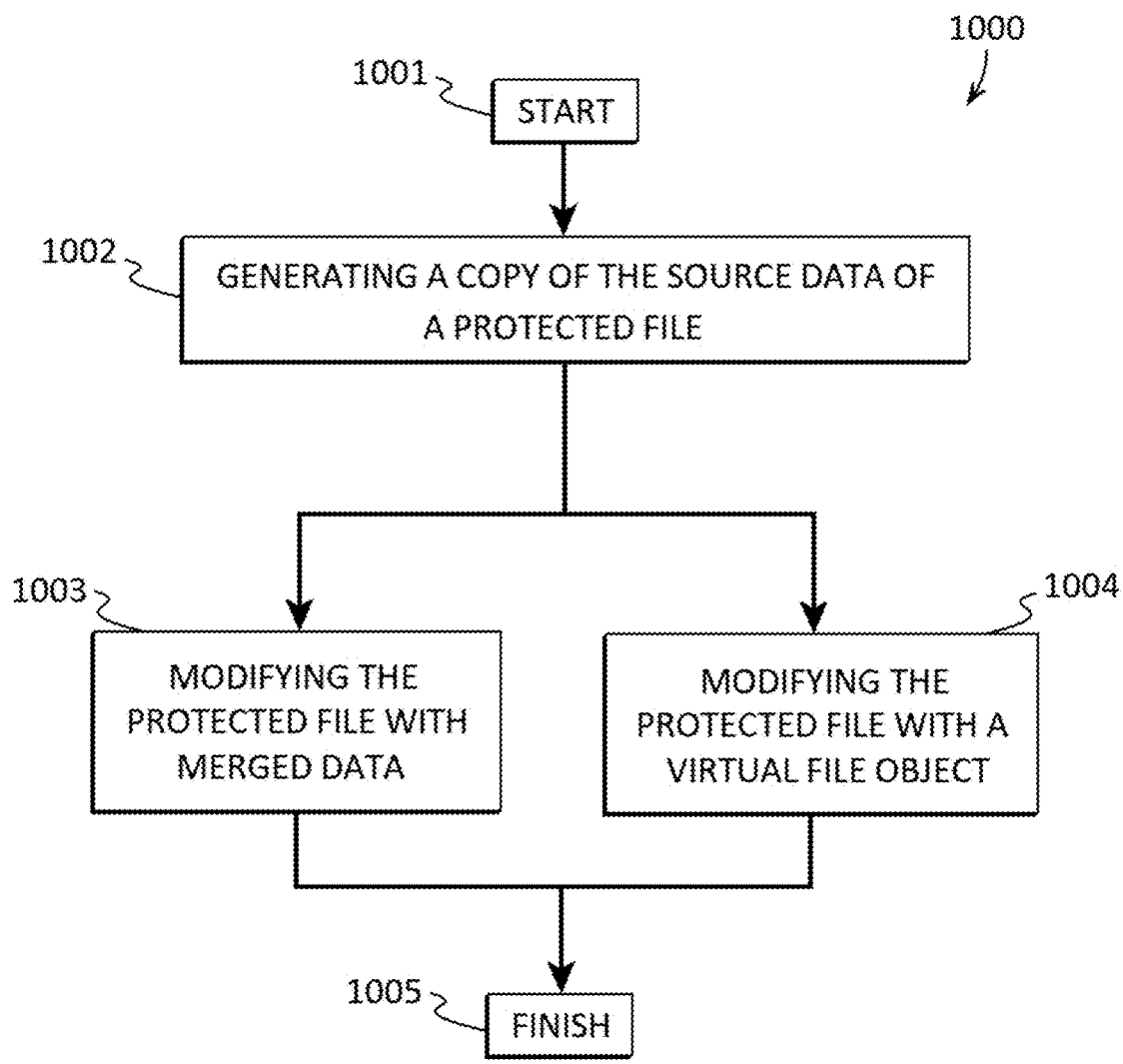
FIG. 10—FIG. 10 depicts a block diagram of an example of a computer-implemented method for protecting data of a protected file according to various embodiments described herein.

FIG. 10 shows a block diagram of an example of a computer-implemented method for protecting data of a protected file ("the method") 1000 according to various embodiments described herein. In some embodiments, the method 1000 may be used to backup or otherwise preserve data of a protected file 111 that is owned or operable by an authorized handler 113 by an operating system 414 or program running on an operating system 414. One or more steps of the method 1000 may be performed by an accessing program 112, authorized handler 113, user interface 114, system service 115, or other program running on an operating system 414 which may be executed by a computing device processor, such as a processor 302 (FIG. 2) and/or a processor 402 (FIG. 3). The method 1000 may be performed at any time, such as before or after any step of methods 700, 800, 900, and/or 1100.

The method 1000 may start 1001 and a copy of the source data, such as file contents, file name, file attributes 111A, etc., of a protected file 111 may be generated by the system 100 in step 1002.

After step 1002, the method may proceed to step 1003 or step 1004.

In step 1003, the protected file 111 may be modified with merged data resulting from a write request so that the file contents of the protected file 111 may comprise the changes to the source data that result from processing the instruction set of the write request. In some embodiments, the protected file 111 may be modified with merged data by changing the file contents of the protected file 111. In further embodiments, the protected file 111 may be modified with merged data by completely replacing or rewriting the protected file 111 with a file having the source data that result from processing the instruction set of the first write request.

In step 1004, the protected file 111 may be modified with a virtual file object 121, 122, associated with the protected file 111. In some embodiments, the protected file 111 may be modified with a virtual file object 121, 122, by changing the file contents of the protected file 111 to reflect the data of the virtual file object 121, 122. In further embodiments, the protected file 111 may be modified with a virtual file object 121, 122, by completely replacing or rewriting the protected file 111 with the virtual file object 121, 122.

In some embodiments, steps 1003 and 1004 may occur automatically after a time period, such as 24 hours, or other time period. For example, 15 minutes, 1 hour, 6 hours, 12 hours, 24 hours, and more preferably greater than 24 hours, such as 36 hours, 48 hours, 72 hours, or other time period that may be between 5 minutes and 10 years. In further embodiments, the time period may set by a user preference setting, and the user preference setting may be read by the authorized handler 113 in order to determine when to perform step 1003 or step 1004.

Figure 11:
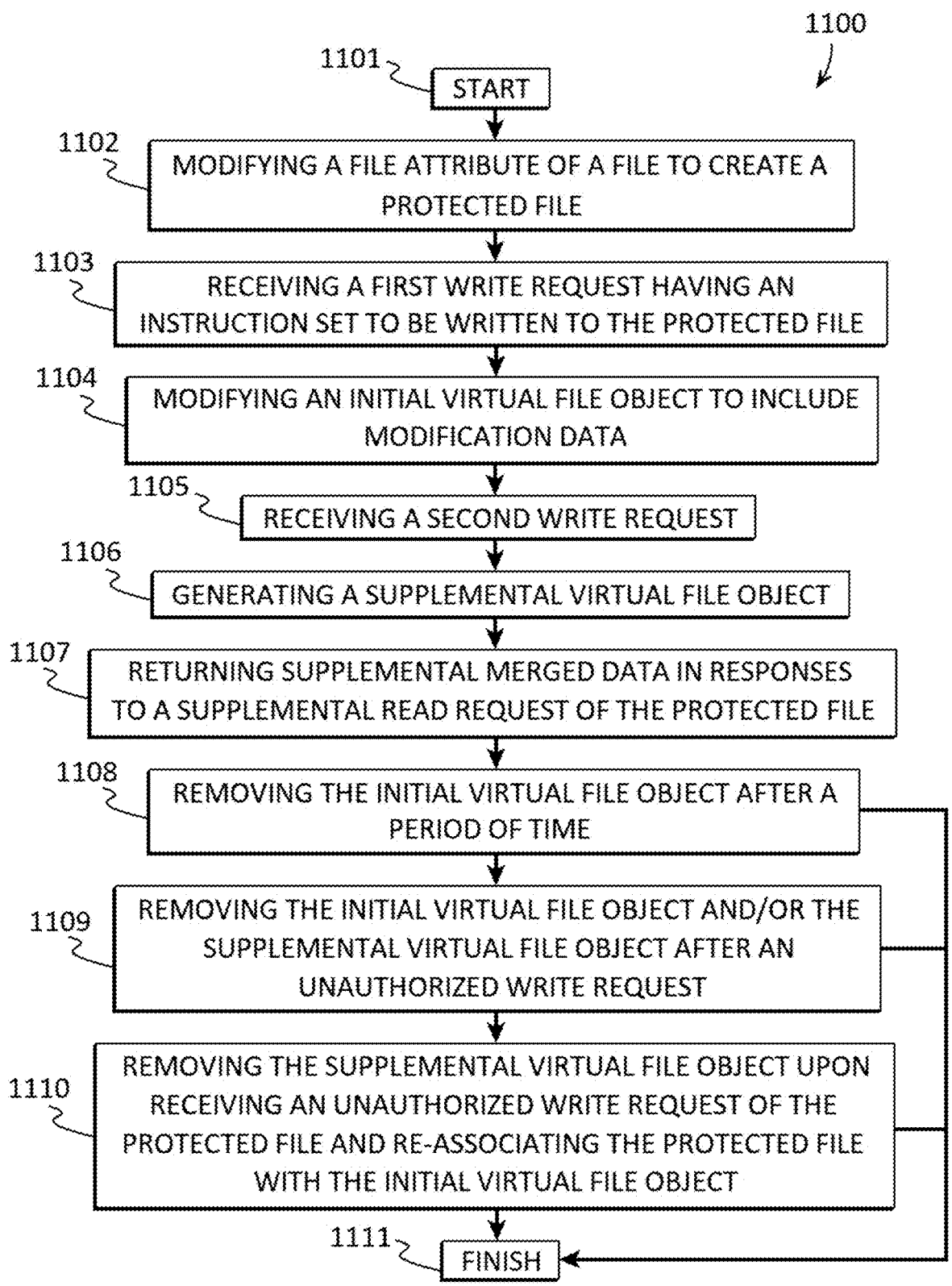
FIG. 11—FIG. 11 illustrates a block diagram of a further example of a computer-implemented method for preventing unauthorized file modification to a file according to various embodiments described herein.

FIG. 11 illustrates a block diagram of an example of another computer-implemented method for preventing unauthorized file modification to a file ("the method") 1100 according to various embodiments described herein. In some embodiments, the method 1100 may be used to protect data of a protected file 111 that is owned or operable by an authorized handler 113 by an operating system 414 or program running on an operating system 414. One or more steps of the method 1100 may be performed by an accessing program 112, authorized handler 113, user interface 114, system service 115, or other program running on an operating system 414 which may be executed by a computing device processor, such as a processor 302 (FIG. 2) and/or a processor 402 (FIG. 3). The method 1100 may be performed at any time, such as before or after any step of methods 700, 800, 900, and/or 1000.

The method 1100 may start 1101 and a file attribute 110A of a file 110 may be modified to create (or convert the file 110 into) a protected file 111 in step 1102. In some embodiments, an authorized handler 113 may modify a file attribute 110A of a file 110 to create a protected file 111. Preferably, the modified file attribute 111A may be configured to instruct a computer processor to permit write access of the (now) protected file 111 only by the authorized handler 113 and to deny write access of the protected file 111 by other programs.

In step 1103, a first write request may be received by the authorized handler 113, the first write request having a first instruction set to be written to the protected file 111.

In step 1104 an initial virtual file object 121 may be modified by the authorized handler 113 to include modification data. In some embodiments, an authorized handler 113 may modify an initial virtual file object 121 to include the instruction set from the first write request by creating the initial virtual file object 121 in a data store 308, 408, and then adding the modification data resulting from performing the instruction set to the initial virtual file object 121. In further embodiments, an authorized handler 113 may modify an initial virtual file object 121 to include the instruction set from the first write request by modifying an existing initial virtual file object 121 in a data store 308, 408, and then adding the modification data to the initial virtual file object 121.

In step 1105 a second write request may be received by the authorized handler 113, the second write request having a second instruction set to be written to the protected file 111.

In step 1106, a supplemental virtual file object 122 may be generated by the authorized handler 113 using the second instruction set. The authorized handler 113 may generate a supplemental virtual file object 121 comprising supplemental merged data after receiving the second write request. Preferably, both the initial virtual file object 121 and the supplemental virtual file object 122 may both be stored on a drive, such as a data store 308, 408, and may both be accessible to the authorized handler 113.

In step 1107, the authorized handler 113 may return supplemental merged data in responses to a subsequent read request of the protected file 111.

In some embodiments, after step 1107, the method 1100 may finish 1111. In further embodiments, after step 1107, the method 1100 may continue to step 1108, 1109, and/or 1110.

In step 1108, the initial virtual file object 121 may be removed from the data store 308, 408, after a period of time. For example, a period of time may be 15 minutes, 1 hour, 6 hours, 12 hours, 24 hours, and more preferably greater than 24 hours, such as 36 hours, 48 hours, 72 hours, or other time period that may be between 5 minutes and 10 years. In further embodiments, the time period may set by a user preference setting, and the user preference setting may be read by the authorized handler 113 in order to determine when to perform step 1108. In some embodiments, the content of a virtual file object 121, 122, such as the modification data, may be moved or written to the source protected file 111 by the authorized handler 113. For example, the virtual file object 121 may remain in the data store 308, 408, but may become a zero-byte file or placeholder file. In some embodiments, the authorized handler 113 may transfer or merge data from a virtual file object 121, 122, to modify the protected file 111 so that the resulting virtual file object 121, 122, may be a zero-byte file or placeholder file. Note that "modify" here may be either fully replacing the protected file 111 or changing or writing to the file to include the merged data.

In step 1109, the initial virtual file object 121 and/or the supplemental virtual file object 122 may be removed after an unauthorized write request is received by the authorized handler 113. Generally, an unauthorized write request may be generated by an unauthorized program, such as ransomware and malicious software programs that may attempt to encrypt the protected file 111.

In step 1110, the supplemental virtual file object 122 may be removed, preferably by the authorized handler 113 or other program of the system 100 upon receiving an unauthorized write request of the protected file 111 and the protected file 111 may be re-associated with the initial virtual file object 121 so that subsequent access requests for the protected file 111 direct the authorized handler 113 to the initial virtual file object 121. For example, step 1110 may occur when a user 101 determines that the changes resulting from a write request to a protected file 111 are undesirable.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random-access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or WiFi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and Wi-Fi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A computer implemented cyber security method for preventing unauthorized modification to a file using an authorized handler, the method comprising the following steps:
    modifying a file attribute of the file to create a protected file, the file attribute configured to instruct a computer processor to permit write access of the protected file only by the authorized handler and to deny write access of the protected file by other programs;

receiving a first write request, the first write request comprising an instruction set to be written to the protected file, the first write request unable to be written to the protected file and is instead transferred to the authorized handler which modifies an initial virtual file object to include the instruction set from the first write request, the initial virtual file object comprising merged data where the merged data comprises source data from the protected file and modification data from the instruction set of the write request;

receiving a read request of the protected file;

determining if there is an initial virtual file object associated with the protected file;

determining if the initial virtual file object comprises merged data; and wherein, based on the determination of the initial virtual file object comprising merged data, returning only one of either (i) the merged data of the initial virtual file object and (ii) the source data of the protected file.

2. The method of claim 1, wherein the authorized handler returns the merged data of the initial virtual file object in response to the read request when both of the following conditions are true (i) an initial virtual file object is present and associated with the protected file and (ii) the initial virtual file object comprises merged data.

3. The method of claim 1, wherein the authorized handler returns the source data of the protected file in response to the read request when at least one of the following conditions are true (i) no initial virtual file object is associated with the protected file and (ii) the initial virtual file object does not comprise merged data.

4. The method according to claim 1, further comprising the following steps performed by the authorized handler in the following sequential order:

generating a copy of the source data of protected file; and modifying the protected file with one of (i) the merged data and (ii) the initial virtual file object.

5. The method according to claim 4, wherein the steps of making a copy of the protected file and modifying the protected file occur automatically after a time period.

6. The method according to claim 5, wherein the time period is set by a user preference setting, the user preference setting read by the authorized handler.

7. The method according to claim 6, wherein the time period is greater than 24 hours.

8. The method according to claim 1, wherein the authorized handler is a filter driver.

9. The method according to claim 1, wherein the protected file comprises an attribute identifying it as a sparse file.

10. The method according to claim 1, wherein the file attribute is a reparse point.

11. The method according to claim 1, wherein the protected file is located within a folder and the authorized handler uses one of (a) the folder name and (b) the folder location to determine if the file attribute should be modified to create a protected file.

12. The method according to claim 1, wherein the authorized handler generates a supplemental virtual file object comprising supplemental merged data after receiving a second write request.

13. The method of claim 12, wherein the protected file is unassociated from the initial virtual file object and the protected file is associated with the supplemental virtual file object so that the supplemental merged data is returned in responses to a subsequent read request of the protected file.

14. The method of claim 12, wherein both the initial virtual file object and the supplemental virtual file object are both stored on a drive and are both accessible to the authorized handler.

15. The method of claim 12, further comprising the step of automatically removing the initial virtual file object after a period of time.

16. The method of claim 15, wherein the period of time is greater than 24 hours.

17. The method of claim 12, further comprising the step of removing at least one of the initial virtual file object and the supplemental virtual file object after an unauthorized write request was made of the protected file.

18. The method of claim 13, further comprising the step of removing the supplemental virtual file object upon receiving an unauthorized write request of the protected file and re-associating the protected file with the initial virtual file object.

19. The method of claim 1, wherein the initial virtual file object is a placeholder object generated prior to the creation of modification data.

20. The method of claim 19, wherein the placeholder object is a 0-byte file.

* * * * *